United States Patent [19]

Fujita et al.

[11] Patent Number: 5,107,967

[45] Date of Patent: Apr. 28, 1992

[54] MOTOR DISC BRAKE SYSTEM

[75] Inventors: Yasuhiko Fujita; Toshiaki Arai; Masami Ogura, all of Saitama, Japan

[73] Assignee: Honda Giken Kogyo Kabushiki Kaisha, Tokyo, Japan

[21] Appl. No.: 549,060

[22] Filed: Jul. 6, 1990

[30] Foreign Application Priority Data

Jul. 6, 1989 [JP] Japan .................................. 1-173039

[51] Int. Cl.⁵ ........................ B60T 13/58; F16D 65/21
[52] U.S. Cl. .................................. 188/72.1; 188/72.8; 188/156
[58] Field of Search ............... 188/156, 157, 158, 161, 188/162, 72.1, 72.8, 72.3; 384/50, 51

[56] References Cited

U.S. PATENT DOCUMENTS

| 3,613,356 | 10/1971 | Woodward | 188/162 X |
|---|---|---|---|
| 4,658,939 | 4/1987 | Kircher et al. | 188/72.8 X |
| 4,721,190 | 1/1988 | Schmidt et al. | 188/71.9 |
| 4,776,707 | 10/1988 | Olschewski et al. | 384/51 |
| 4,809,824 | 3/1989 | Fargier et al. | 188/72.8 |
| 4,836,338 | 6/1989 | Taig | 188/72.8 X |
| 4,850,457 | 7/1989 | Taig | 188/156 X |
| 4,860,859 | 8/1989 | Yamatoh et al. | 188/156 X |

FOREIGN PATENT DOCUMENTS

| 173940 | 2/1953 | Fed. Rep. of Germany | 384/50 |
|---|---|---|---|
| 1346191 | 11/1963 | France | 384/51 |
| 60-206766 | 10/1985 | Japan . | |

Primary Examiner—Matthew C. Graham
Attorney, Agent, or Firm—Lyon & Lyon

[57] ABSTRACT

In a motor disc brake system using an electric motor as a drive source of a thrust generating device that can move a piston in advancing and retracting directions, a slide bearing is interposed between a piston and a brake caliper carrying the piston for receiving a side thrust which is applied from a friction pad to the piston during braking. This serves to suppress increase in the slide resistance of the piston even under the action of such side thrust, enabling a strong braking force to be provided with use of a motor of small capacity.

13 Claims, 6 Drawing Sheets

MOTOR DISC BRAKE SYSTEM

BACKGROUND OF THE INVENTION

1. FIELD OF THE INVENTION

The field of the invention is disc brake systems applicable mainly to automotive brake systems and more particularly is improvements in a motor disc brake system including a brake disc connected to a rotating member to be braked, a friction pad opposed to a side surface of the brake disc for advancing and retracting movements relative to the brake disc, a piston for pressing a back surface of the friction pad when the piston advances, a brake caliper mounted to a stationary bracket and carrying the piston such that the piston is capable of advancing and retracting, and a thrust generating device provided on the brake caliper and capable of generating a thrust to cause advancing and retracting movements of the piston, said thrust generating device comprising an electric motor, a drive shaft connected to an output shaft of the electric motor, a rotary shaft disposed coaxially with the piston and screw-fitted to the piston by a ball screw, and a reduction device disposed between the drive shaft and the rotary shaft to permit the drive shaft to drive the rotary shaft at a reduced speed.

2. DESCRIPTION OF THE PRIOR ART

In this type of disc brake device, it is conventionally arranged that the piston is directly carried on the inner peripheral surface of the cylinder bore of the brake caliper, as disclosed in Japanese patent publication Kokai No. 60-206766, for example. In this arrangement, when the electric motor is rotated in the normal direction and an advancing thrust is applied to the piston via the ball screw to bring the friction pad into pressure contact with the brake disc for braking action, a side thrust acts on the piston due to a brake reaction force coming from the brake disc and this increases the slide resistance of the piston rapidly, leading to an increase in the load of the electric motor. Consequently, it is required that an electric motor of a large capacity be employed in order to strengthen the braking force against such load increase.

SUMMARY OF THE INVENTION

The present invention has been proposed in view of such circumstances and an object thereof is to provide a motor disc brake system which is constructed such that a braking operation causes only a small amount of increase in the slide resistance of the piston and so the electric motor can be of a small capacity and thus be made compact.

In order to achieve the object, according to a first feature of the invention, there is proposed a motor disc brake system including a brake disc connected to a rotating member to be braked, a friction pad opposed to a side surface of the brake disc for advancing and retracting movements relative to the brake disc, a piston for pressing a back surface of the friction pad when the piston advances, a brake caliper mounted to a stationary bracket and carrying the piston such that the piston is capable of advancing and retracting, and a thrust generating device provided on the brake caliper and capable of generating a thrust to cause advancing and retracting movements of the piston, said thrust generating device comprising an electric motor, a drive shaft connected to an output shaft of the electric motor, a rotary shaft disposed coaxially with the piston and screw-fitted to the piston by a ball screw, and a reduction device disposed between the drive shaft and the rotary shaft to permit the drive shaft to drive the rotary shaft at a reduced speed, wherein a slide bearing is interposed between the piston and the brake caliper for carrying a side thrust which is applied from the friction pad to the piston during braking.

With the above feature, even when a side thrust acts on the piston due to a brake reaction force of the brake disc during braking operation, the slide bearing serves to suppress an increase in the slide resistance of the piston to a small extent. Accordingly, the braking force can be strengthened by using a relatively small output of the electric motor and so the motor can be made of a smaller capacity and therefore of a compact structure.

According to a second feature of the invention, it is arranged in addition to the first feature that the slide bearing comprises a plate-like retainer and a plurality of rollers retained in a plurality of retaining holes provided in the retainer, said rollers being rollable in response to advancing and retracting movements of the piston.

With this second feature, a slide bearing of a large loading capacity can be obtained at a low cost.

According to a third feature of the invention, in addition to the first feature, it is further arranged that the reduction device comprises a worm gear secured to the drive shaft and a worm wheel secured to the rotary shaft for meshing engagement with the worm wheel.

With this third feature, the cooperation of the worm gear and worm wheel permits the drive shaft to drive the rotary shaft at a reduced speed but prevents transmission of a reverse load from the rotary shaft to the drive shaft, whereby during braking operation the braking force can be held at a current level by stopping the operation of the electric motor. This is advantageous in that holding the braking force at the time of antilock control operation or parking can be effected without consuming electric power.

According to a fourth feature of the invention, it is also arranged in addition to the first feature that the brake caliper is connected to the bracket in a slidable manner along an axis of the brake disc, first and second clamping arms being disposed on the brake caliper so as to straddle the brake disc, said friction pad comprising first and second friction pads which are carried on the bracket at respective positions between opposite side surfaces of the brake disc and the first and second clamping arms, said piston and said thrust generating device being provided on the first clamping arm.

With this fourth feature, a thrust generating device including an expensive electric motor is used to operate a pair of left and right friction pads and moreover a large part of the brake reaction force applied to the friction pads from the brake disc is supported by the bracket, as a result of which a side thrust acting on the piston due to the brake reaction force can be reduced and the capacity of the electric motor can further be made small.

According to a fifth feature of the invention, in addition to the first feature, it is arranged that the thrust generating device is provided in a housing which is connected to the brake caliper by a bolt.

This fifth feature permits the thrust generating device to be provided in a sub-assembly, making the mass-production and maintenance characteristics favourable.

According to a sixth feature of the invention, it is further arranged in addition to the first feature that the rotary shaft comprises a smaller diameter shaft portion associated with the reduction device and a larger diameter shaft portion associated with the ball screw, the smaller diameter shaft portion being carried via a radial bearing on a housing which is connected to the brake caliper by a bolt, a thrust bearing being interposed between the housing and a step formed between the smaller and larger diameter shaft portions.

Owing to this sixth feature, the operational reaction force of the piston which acts on the rotary shaft during braking can be carried on the housing via the thrust bearing.

Moreover, according to a seventh feature of the invention, in addition to the first feature, it is arranged that the rotating member to be braked is a vehicle wheel and the thrust generating device is housed in an inside space defined by a rim of the wheel.

This seventh feature enables the wheel rim to serve as a wall for protecting the thrust generating device inclusive of the electric motor from obstacles such as flying pebbles or the like.

The afore-mentioned and other objects, features and advantages of the present invention will be apparent from reading the following detailed description of a preferred embodiment taken in conjunction with the accompanying drawings.

DESCRIPTION OF PREFERRED EMBODIMENT

One embodiment according to the present invention will be described hereinafter with reference to the accompanying drawings.

Figure 1:
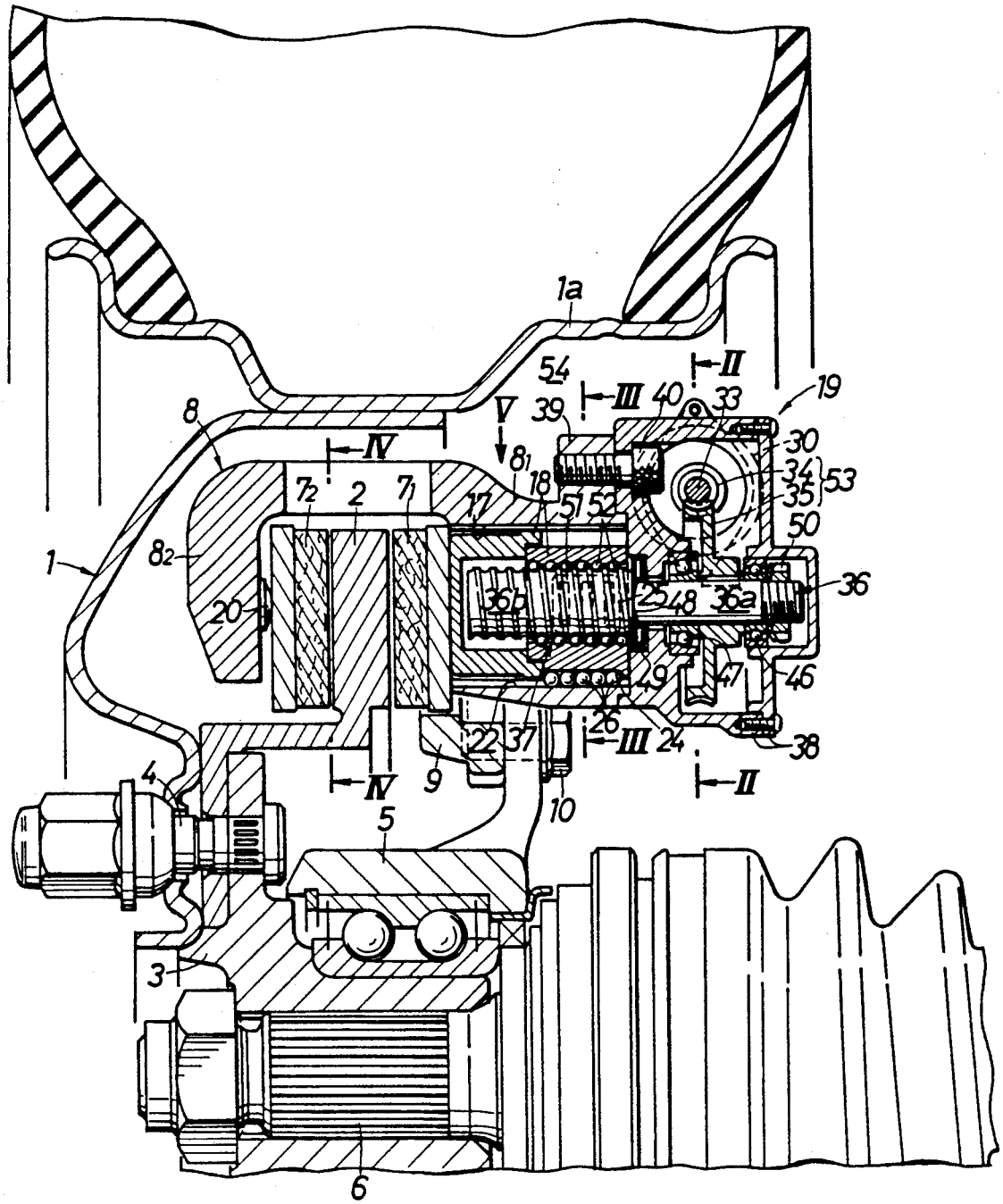
FIG. 1 is a longitudinally sectioned front view of a part of an automotive wheel and a motor disc brake system for braking the wheel.

First referring to FIG. 1, a wheel of an automobile is together with a brake disc 2 connected to a hub 3 by bolts 4. The hub 3 is rotatably carried by a knuckle 5 and is coupled to a wheel drive shaft 6.

A pair of friction pads $7_1$ and $7_2$ are disposed so as to face left and right side surfaces of the brake disc 2 and a brake caliper 8 is disposed to straddle these friction pads $7_1$, $7_2$ and brake disc 2. Hereinafter, one of the pair of friction pads $7_1$, $7_2$, that is, the one $7_1$ located inwardly of a vehicle body, will be called a first friction pad and the other $7_2$ will be called a second friction pad.

Figure 4:
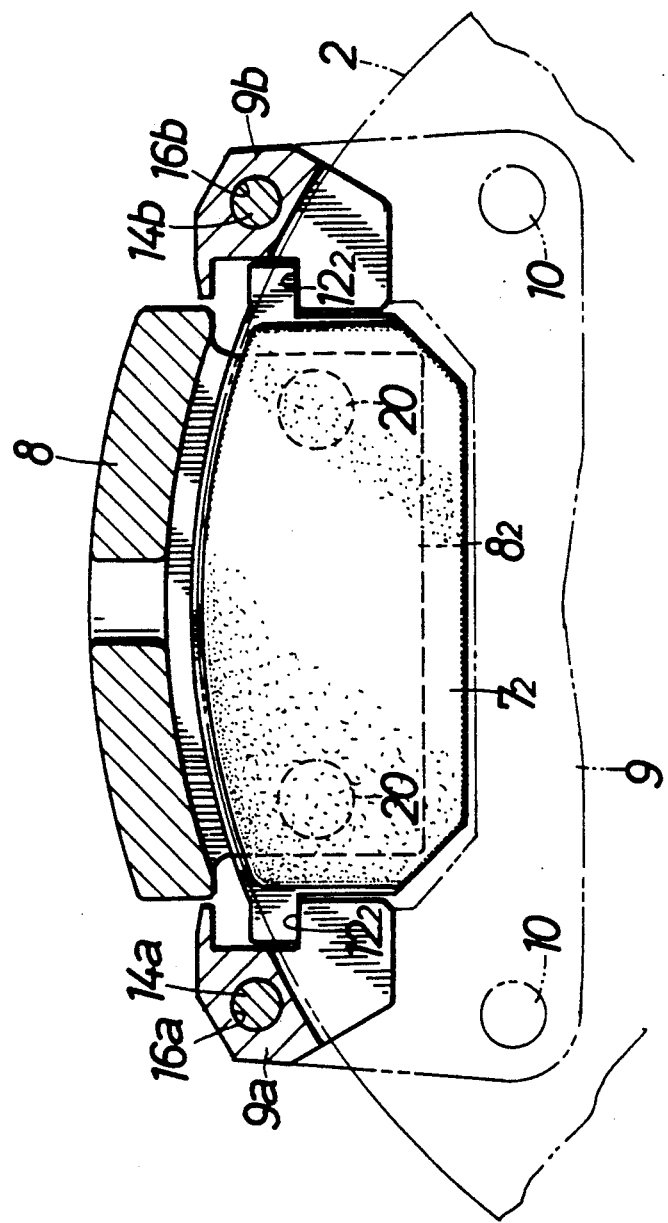
FIG. 4 is a sectional view taken along a line IV—IV of FIG. 1.
Figure 5:
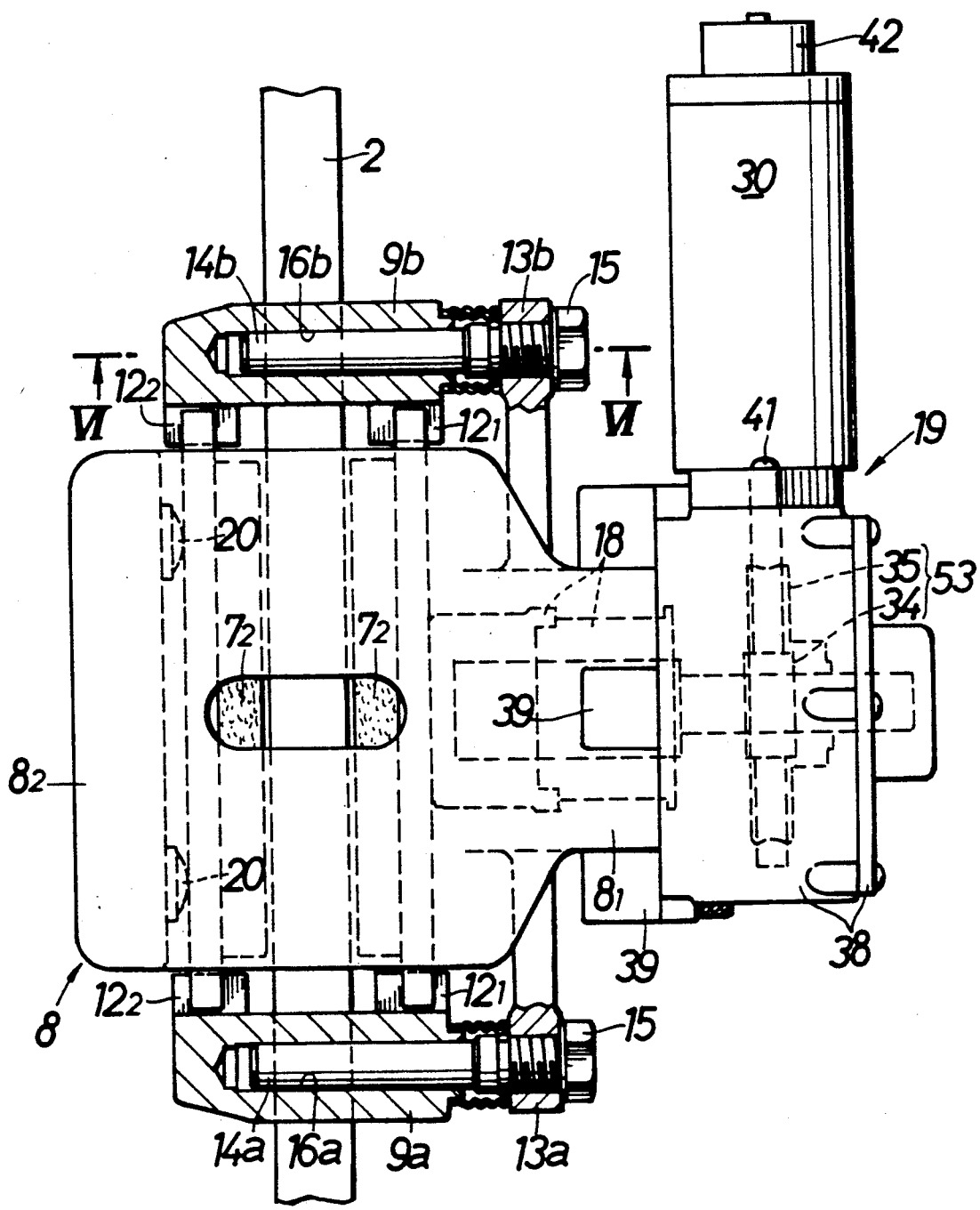
FIG. 5 is a view seen in the direction of an arrow V of FIG. 1.

In FIGS. 1, 4 and 5, a bracket 9 is disposed adjacent to one side surface of the brake disc 2 that is on the side of the first friction pad $7_1$ and this bracket 9 is connected to the knuckle 5 by bolts 10.

Figure 6:
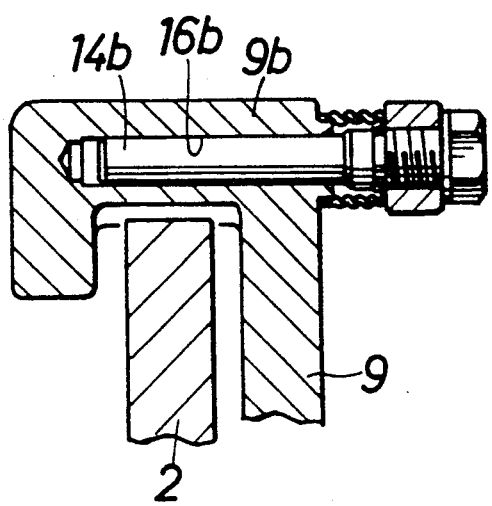
FIG. 6 is a sectional view taken along a line VI—VI of FIG. 5.

The bracket 9 has a pair of front and rear arms $9a$ and $9b$ which are arranged at a predetermined distance therebetween in the circumferential direction of the brake disc 2 and these arms are bent at their tip ends into a converted U-shape so as to straddle the outer peripheral portion of the brake disc 2 (see FIG. 6). On opposed surfaces of the arms $9a$ and $9b$ there are integrally formed two sets of guide rails $12_1$, $12_1$; $12_2$, $12_2$ which are arranged side by side with the brake disc 2 interposed therebetween. Both of front and rear ends of the back plate of the first friction pad $7_1$ are engaged on one pair of guide rails $12_1$, $12_1$ and likewise both of front and rear ends of the back plate of the second friction pad $7_2$ are engaged on the other pair of guide rails $12_2$, $12_2$, respectively, in a slidable fashion in the axial direction of the brake disc 2.

The brake caliper 8 is formed with first and second clamping arms $8_1$ and $8_2$ which face the backs of the first and second friction pads $7_1$ and $7_2$, respectively. The first clamping arm $8_1$ is formed integrally with a pair of front and rear tabs $13a$ and $13b$ which project circumferentially of the brake disc 2. A pair of slide pins $14a$ and $14b$ are secured by bolts 15 to these tabs $13a$ and $13b$, respectively, so as to extend parallel to the axis of the brake disc 2. The slide pins $14a$ and $14b$ are slidably inserted into pin holes $16a$ and $16b$ provided in the arms $9a$ and $9b$ of the bracket 9.

The first clamping arm $8_1$ has a cylinder bore 17 extending in the axial direction of the brake disc 2 to receive therein a piston 18 of a bottomed cylindrical shape in a fitted fashion and the bottom wall portion of the piston 18 comes into abutment against the back surface of the first friction pad $17_1$. A thrust generating device 19 is provided on the first clamping arm $8_1$ for causing the piston 18 to advance and retract relative to the first friction pad $7_1$.

The second clamping arm $8_2$ is formed with a pair of front and rear spherical protrusions 20 and 20 which are placed in abutment against the back surface of the second friction pad $7_2$.

On the inner peripheral surface of the cylinder bore 17 there are formed a pair of rectangular guide grooves 21 and 21 of a relatively small depth which are opposed to each other in the arrangement direction of the pair of slide pins $14a$, $14b$, and a pair of semicircular guide grooves 22 and 22 located below the rectangular guide grooves.

On the other hand, on the outer peripheral surface of the piston 18 there are formed a pair of flat surfaces 23 and 23 so as to correspond to the rectangular guide grooves 21 and 21, and a pair of semicircular guide grooves 24 and 24 corresponding to the semicircular guide grooves 22 and 22. Slide bearings 25 are mounted between respective rectangular guide grooves 21, 21 and flat surfaces 23, 23 and a plurality of balls 26, 26 . . . are mounted between the semicircular guide grooves 22 and 24.

Figure 3:
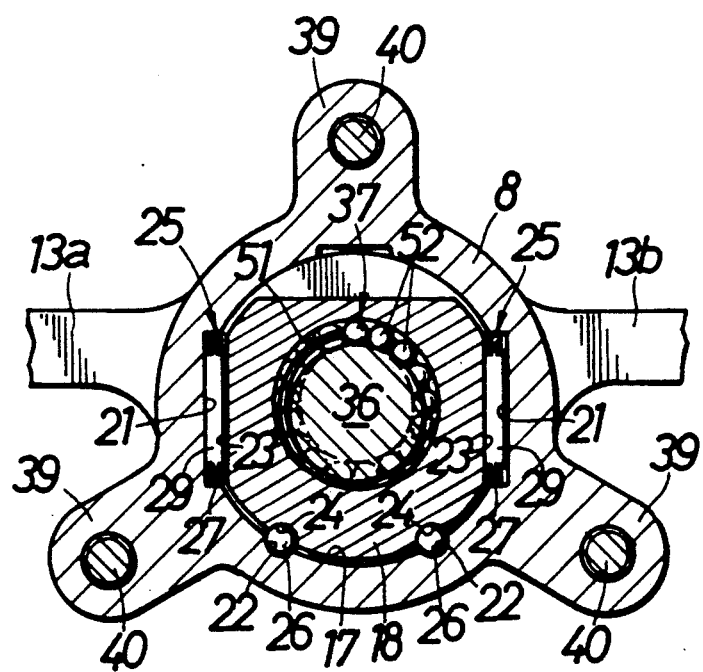
FIG. 3 is an enlarged sectional view taken along a line III—III of FIG. 1.
Figure 7:
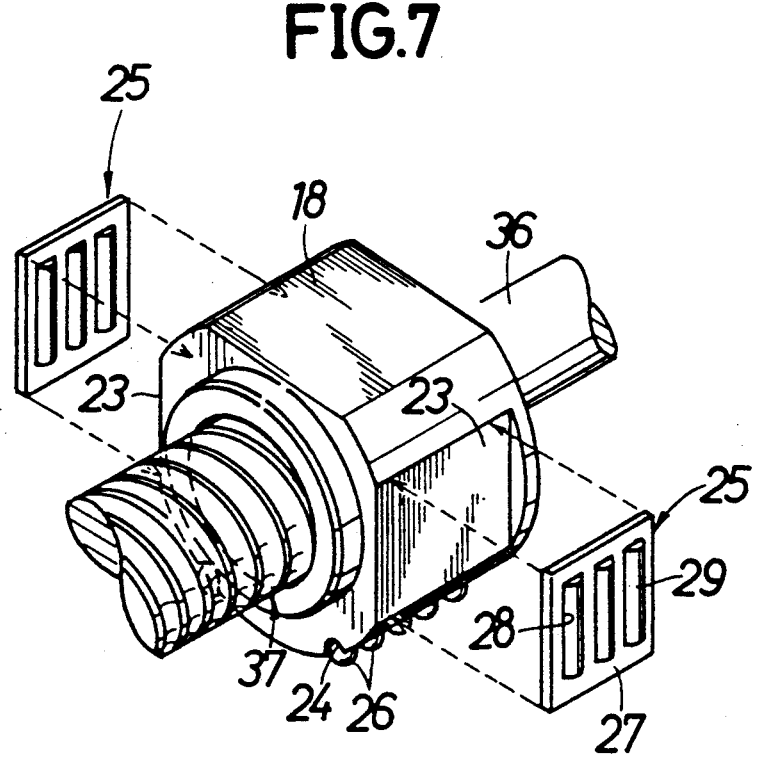
FIG. 7 is an exploded perspective view of an essential portion.

As shown in FIGS. 3 and 7, each slide bearing 25 comprises a plate-like retainer 27 which is received in the rectangular guide groove 21 and is movable in the sliding direction of the piston 18, and a plurality of rollers 29 . . . retained in a plurality of rectangular retaining holes 28 . . . bored in the retainer 27. Accordingly, the rollers 29 . . . and the balls 26 . . . serve to guide the sliding movement of the piston 18 and simultaneously to prevent rotation of the piston 18 around the axis thereof.

Figure 2:
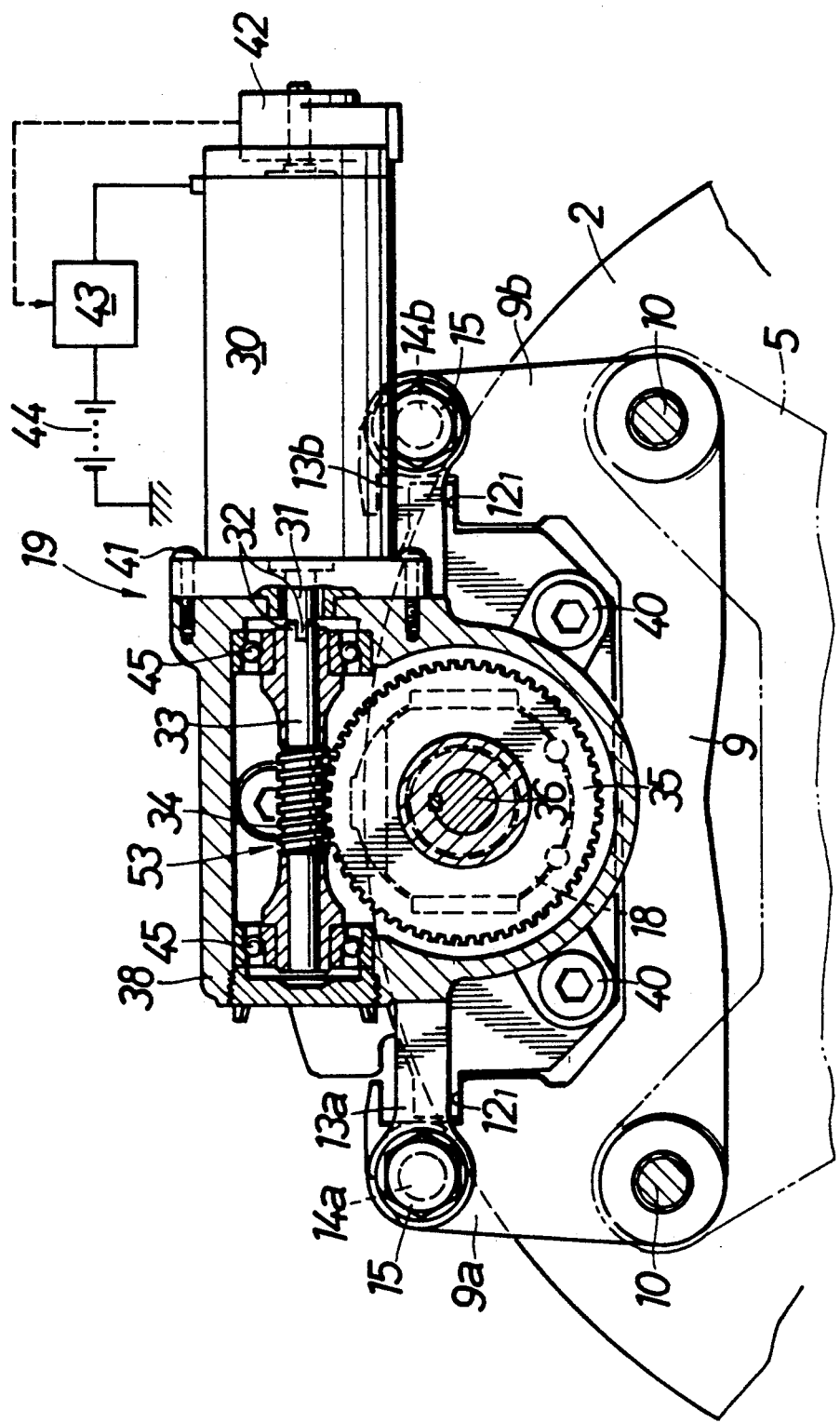
FIG. 2 is a sectional view taken along a line II—II of FIG. 1.

Referring again to FIGS. 1 and 2, the thrust generating device 19 comprises a DC type electric motor 30, a drive shaft 33 connected to an output shaft 31 of the electric motor 30 via a joint 32, a worm gear 34 provided on the drive shaft 33, a worm wheel 35 meshed with the worm gear 34, a rotary shaft 36 with the worm wheel 35 keyed thereto, a ball screw 37 for converting a rotating movement of the rotary shaft 36 into an axial displacement of the piston 18, and a housing 38 for accommodating the worm gear 34 and worm wheel 35 therein. The housing 38 is secured to a plurality of tabs 39 formed radially on an end portion of the first clamping arm 8₁ by bolts 40.

The electric motor 30 is secured to the outer side surface of the housing 38 by screws 41 such that its output shaft 31 is directed in the arrangement direction of the pair of slide pins 14a, 14b. An encoder 42 is attached to the rear end of the electric motor 30 for detecting the amount of operation of the motor. To this motor 30 are connected a control circuit 43, which is operated by a brake pedal not shown, and an electric power source 44 and an output signal from the encoder 42 is fed to the control circuit 43.

The drive shaft 33 is carried at its opposite ends on front and rear end walls of the housing 38 via a pair of angular contact ball bearings 45, 45.

The rotary shaft 36 comprises a smaller diameter shaft portion 36a that carries the worm wheel 35 thereon and a larger diameter shaft portion 36b screw-fitted into the piston 18 by the ball screw 37, the smaller diameter shaft portion 36a being supported on the housing 38 via a pair of radial ball bearings 46, 47 which are disposed on opposite sides of the worm wheel 36. To prevent axial displacement of the rotary shaft 36, a thrust roller bearing 49 is interposed between a step 48 provided between both the shaft portions 36a and 36b and the housing 38, and a nut 50 is screwed to the tip end of the smaller diameter shaft portion 36a at a location adjacent the bearing 46.

The ball screw 37 is of a known type comprising a screw-shaped ball passage 51 formed on the inner peripheral surface of the cylindrical piston 18 as well as on the outer peripheral surface of the larger diameter shaft portion 36b and a multitude of balls 52, 52 . . . loaded in the ball passage 51. The worm gear 34 and the worm wheel 35 together constitute a reduction device 53 that permits the drive shaft 33 to drive the rotary shaft 36 at a reduced speed but prevents transmission of a reverse load from the rotary shaft 36 to the drive shaft 33. This type of reduction device 53 may be replaced by a hypoid gear type one of a high ratio.

As shown in FIG. 1, the brake caliper 8 and the thrust generating device 19 are disposed so as to be located within an inside space 54 defined by a rim 1a of the wheel 1.

The operation of this embodiment will be described in the following.

For applying a braking action to the wheel 1, the control circuit 43 is operated so as to rotate the electric motor in the normal direction. A normal rotation of the electric motor 30, that is, a normal rotation of the output shaft 31 causes a normal rotation of the drive shaft 33 which in turn results in driving the rotary shaft 36 at a reduced speed in a direction to effect braking through the worm gear 34 and wheel 35. The rotary shaft 36 then gives a thrust to the piston 18 in the advancing direction through the feed action of the ball screw 37 and a reaction force generated thereby is borne by the housing 38 via the thrust roller bearing 49.

Then the first friction pad 7₁ comes into pressure contact with one side surface of the brake disc 2 in receipt of the advancing thrust of the piston 18 on the back surface of the pad 7₁ and simultaneously in a reaction thereof the brake caliper 8 is displaced in a direction opposite to the advancing movement of the piston 18 while causing the slide pins 14a, 14b to slide in the pin holes 16a, 16b, whereby the second clamping arm 8₂ is operated to push the back surface of the second friction pad 7₂ bringing the pad 7₂ into pressure contact with the other side surface of the brake disc 2.

Thus, the first and second friction pads 7₁ and 7₂ can equally be pressed against the opposite side surfaces of the brake disc 2 thereby applying a braking force to the brake disc 2, that is, to the wheel 1.

At this moment, the brake reaction force exerted from the brake disc 2 to the respective friction pads 7₁ and 7₂ is transmitted to and carried by the guide rails 12₁ and 12₂ that carry the back plates of the friction pads 7₁ and 7₂, respectively.

If the arm 9a or 9b of the bracket 9 is flexed more or less due to the afore-mentioned brake reaction force, the mutually abutting portions of the first friction pad 7₁ and the piston 18 are displaced from each other by an amount corresponding to the amount of flexure of the arm and at this time the first friction pad 7₁ exerts a side thrust to the piston 18. However, this side thrust can be primarily carried on the brake caliper 8 via the slide bearing 25 so that even under the action of such a side thrust the rolling function of the slide bearing 25 enables the piston 18 to advance lightly thus contributing to strengthening the braking force.

It should be noted here that since the reduction device 53 comprising the worm gear 34 and the worm wheel 35 serves to prevent transmission of a reverse load from the rotary shaft 36 to the drive shaft 33, if the operation of the electric motor 30 is stopped at a predetermined advancing position of the piston 18, the rotary shaft 36 can be locked by the reduction device 53 to hold the piston 18 at that predetermined advancing position, thereby maintaining the braking force acting on the brake disc 2 at the current level.

Accordingly, at the time of antilock control operation or parking, after a predetermined advancing thrust has been applied to the piston 18 by operating the electric motor 30, the operation of the motor 30 may be stopped. In doing so, a desired braking condition can be maintained without consuming electric power uselessly.

When it is desired to release the brake, the control circuit 43 is operated so as to rotate the output shaft 31 of the electric motor 30 in a reverse direction. Then the system is operated in a reversed manner to the afore-mentioned operation and the piston 18 is retracted to release the pressure contact force of the friction pads 7₁ and 7₂ acting on the brake disc 2, thus relieving the wheel 1 of the brake force.

Such a brake release condition is detected by the encoder 42 sensing a predetermined amount of reverse rotation of the electric motor 30 and a stop signal outputted from the encoder is used to control the control circuit 43 for stopping the operation of the electric motor 30, i.e., the supply of electric power to the motor.

In an assembling process, the electric motor 30, reduction device 53, drive shaft 33, rotary shaft 36 and other associated components are first of all incorporated into the housing 38 to form a sub-assembly of thrust generating device 19 and then the housing 38 is tightened to the brake caliper 8 by bolts 40. These steps are advantageous in improving the mass-production and maintenance characteristics.

Since the thrust generating device 19 is along with the brake caliper 8 housed within the inside space 54 defined by the rim 1a of the wheel 1, the wheel 1 serves as a protective wall for the device 19 and in particular the electric motor 30 outside of the housing 38 and protects them from obstacles such as flying pebbles.

What is claimed is:

1. A motor disc brake system including a brake disc connected to a rotting member to be braked, a friction pd opposed to a side surface of the brake disc for advancing and retracting movement relative to the brake disc, a piston for pressing a back surface of the friction pad when the piston advances, a brake caliper mounted to a stationary bracket and carrying the piston such that the piston is capable of advancing and retracting toward the brake disc and is prevented from rotating relative to the brake capiler, and a thrust generating device provided on the brake caliper and capable of generating a thrust to cause advancing and retracting movements of the piston, said thrust generating device comprising an electric motor, a drive shaft connected to an output shaft of the electric motor, a drive shaft connected to an output shaft of the electric motor, a rotary shaft disposed coaxially with the piston and screw-fitted to the piston by a ball screw, and a reduction device disposed shaft for driving the rotary shaft at a reduced speed, wherein a slide bearing is interposed between the piston and the brake caliper for carrying a side thrust which is applied from the friction pad to the piston during braking.

2. A system according to claim 1, wherein said slide bearing comprises a plate-like retainer and a plurality of rollers, retained in a plurality of retaining holes provided in the retainer, said rollers being rollable in response to advancing and retracting movements of the piston.

3. A system according to claim 1, wherein said reduction device comprises a worm gear secured to the drive shaft and a worm wheel secured to the rotary shaft for meshing engagement with the worm wheel.

4. A system according to claim 1, wherein said brake caliper is connected to the bracket in a slidable manner along an axis of the brake disc, first and second clamping arms being disposed on the brake caliper so as to straddle the brake disc, said friction pad comprising first and second friction pads which are carried on the bracket at respective positions between opposite side surfaces of the brake disc and the first and second clamping arms, said piston and said thrust generating device being provided on the first clamping arm.

5. A system according to claim 1, wherein said thrust generating device is provided in a housing which is connected to the brake caliper by a bolt.

6. A system according to claim 1, wherein said rotary shaft comprises a smaller diameter shaft portion associated with the reduction device and a larger diameter shaft portion associated with the ball screw, the smaller diameter shaft portion being carried via a radial bearing on a housing which is connected to the brake caliper by a bolt, a thrust bearing being interposed between the housing and a step formed between the smaller and larger diameter shaft portions.

7. A system according to claim 1, wherein said rotating member to be braked is a vehicle wheel and said thrust generating device is housed in an inside space defined by a rim of the wheel.

8. A system according to claim 1, wherein said slide bearing is disposed in a planar spacing defined between said brake caliper and said piston, said spacing extending substantially in a radial direction of the brake disc along an axis of the piston.

9. A system according to claim 8, wherein said slide bearing is provided in a pair and said planar spacings are located on radial opposite sides of the piston in parallel to each other.

10. A system according to claim 8, wherein a groove is further defined between said piston and said brake caliper so as to extent along the axis of the piston and balls are received in said groove.

11. A system according to claim 10, wherein a pair of said grooves is provided which are spaced circumferentially of the brake disc.

12. A system according to claim 1, wherein said piston is disposed in a bore defined in said brake caliper and said rotary shaft is received within a cylindrical bore defined in the piston with said ball screw interposed therebetween.

13. A system according to claim 12, wherein said piston is formed separate from said friction pad.

* * * * *

UNITED STATES PATENT AND TRADEMARK OFFICE
CERTIFICATE OF CORRECTION

PATENT NO. : 5,107,967
DATED : April 28, 1992
INVENTOR(S) : Fujita et al.

It is certified that error appears in the above-identified patent and that said Letters Patent is hereby corrected as shown below:

IN THE CLAIMS:

Claim 1, column 7, line 2, delete "rotting" and insert -- rotating --.

Claim 1, column 7, line 3, delete "pd" and insert -- pad --.

Claim 1, column 7, line 4, delete "movement" and insert -- movements --.

Claim 1, column 7, after line 18, insert -- between and operably connecting the drive shaft and the rotary --.

Claim 2, column 7, line 26, delete the comma after "rollers".

Signed and Sealed this

Twenty-sixth Day of October, 1993

Attest:

BRUCE LEHMAN

Attesting Officer

Commissioner of Patents and Trademarks